(12) United States Patent
Lee et al.

(10) Patent No.: US 6,366,936 B1
(45) Date of Patent: Apr. 2, 2002

(54) PIPELINED FAST FOURIER TRANSFORM (FFT) PROCESSOR HAVING CONVERGENT BLOCK FLOATING POINT (CBFP) ALGORITHM

(75) Inventors: Kyu-Seon Lee, Sungnam; Sang-Jin Park, Kwachun; Lak-Hyun Jang, Anyang; Jung-Il Han, Seoul, all of (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 0 days.

(21) Appl. No.: 09/303,688

(22) Filed: May 3, 1999

(30) Foreign Application Priority Data

Jan. 12, 1999 (KR) .................................. 99-562

(51) Int. Cl.⁷ .............................. G06F 15/00

(52) U.S. Cl. .................. 708/404; 708/406; 708/408

(58) Field of Search ................. 708/403, 404, 708/405, 406, 408, 409

(56) References Cited

U.S. PATENT DOCUMENTS

| | | |
|---|---|---|
| 5,163,017 A | 11/1992 | Wong et al. |
| 5,481,488 A | 1/1996 | Luo et al. |

*Primary Examiner*—Chuong Dinh Ngo
(74) *Attorney, Agent, or Firm*—Morgan, Lewis & Bockius LLP

(57) ABSTRACT

A pipelined FFT (fast Fourier transform) processor including a CBFP (convergent block floating point) algorithm, includes an inverse multiplexer for inverse-multiplexing an 8K-/2K-point input data, a first to sixth radix-4 operation circuit for receiving an output of the inverse multiplexer and performing a butterfly operation, a multiplexer connected between the first and second radix-4 operation circuits and for selectively outputting an output of the inverse multiplexer or a first butterfly unit, a radix-2 operation circuit connected to the sixth radix-4 operation circuits and for performing a butterfly operation, a convergent block floating point circuit connected to respective output terminals of the radix-4 operation circuit and the radix-2 operation circuit and for scaling a butterfly operation result, an addition circuit for accumulation and adding scaling indexes outputted from the convergent block floating point circuit, and a decoder for scaling an output of the radix-2 operation circuit in accordance with the scaling indexes outputted form the addition circuit.

20 Claims, 12 Drawing Sheets

| (T) | 0····11 | 12 | 13 | 14 | 15 | 16 | 17 | 18 | 19 | 20 | 21 | 22 | 23 | 24 | 25 | 26 | 27 | 28 | 29 | ··· |
|---|---|---|---|---|---|---|---|---|---|---|---|---|---|---|---|---|---|---|---|---|
| D0 | | 0 | 1 | 2 | 3 | 4 | 5 | 6 | 7 | 8 | 9 | 10 | 11 | 12 | 13 | 14 | 15 | 0' | 1' | ··· |
| D1 | | 12 | 13 | 14 | 15 | 0 | 1 | 2 | 3 | 4 | 5 | 6 | 7 | 8 | 9 | 10 | 11 | 12' | 13' | ··· |
| D2 | | 8 | 9 | 10 | 11 | 12 | 13 | 14 | 15 | 0 | 1 | 2 | 3 | 4 | 5 | 6 | 7 | 8' | 9' | ··· |
| D3 | | 4 | 5 | 6 | 7 | 8 | 9 | 10 | 11 | 12 | 13 | 14 | 15 | 0 | 1 | 2 | 3 | 4' | 5' | ··· |

$\qquad$ m=0 $\qquad$ m=1 $\qquad$ m=2 $\qquad$ m=3 $\qquad$ m=0

FIG. 12 i) FFT MODE (inv ='0')

| m | s4 | s5 | s6 |
|---|----|----|----|
| 0 | 0  | 0  | 0  |
| 1 | 1  | 0  | 1  |
| 2 | 0  | 1  | 1  |
| 3 | 1  | 1  | 0  | ii) IFFT MODE (inv ='1')

| m | s4 | s5 | s6 |
|---|----|----|----|
| 0 | 0  | 0  | 0  |
| 1 | 1  | 1  | 0  |
| 2 | 0  | 1  | 1  |
| 3 | 1  | 0  | 1  |

FIG. 13

| STAGE | DELAY UNIT LATENCY | CONTROL SIGNAL PERIOD | ROM NUMBER | ROM ADDRESS (ADDR) |
|-------|--------------------|-----------------------|------------|---------------------|
| 1 | 2048 | 2048 | 16 | 512 |
| 2 | 512 | 512 | 64 | 128 |
| 3 | 128 | 128 | 256 | 32 |
| 4 | 32 | 32 | 1024 | 8 |
| 5 | 8 | 8 | 4096 | 2 |
| 6 | 2 | 2 | 8192 | 1 |

PIPELINED FAST FOURIER TRANSFORM (FFT) PROCESSOR HAVING CONVERGENT BLOCK FLOATING POINT (CBFP) ALGORITHM

BACKGROUND OF THE INVENTION

1. Field of the Invention

The present invention relates to a pipelined FFT (fast Fourier transform) construction, and more particularly, to an improved FFT processor having a CBFP (convergent block floating point) algorithm.

2. Description of the Background Art

A fast Fourier transform is one of the most significant algorithms in a DSP (digital signal processing) field and it is a general term representing DFT (discrete Fourier transform).

The FFT algorithm is implemented in integrated circuits of one or more physical devices so as to process a signal at real time. The fast Fourier transform operation is performed by a software implemented in a programmable DSP or by an FFT-exclusive processor. The most significant part in the FFT processor hardware system is a butterfly processor performing arithmetic operation. A FFT butterfly calculation is implemented by a $\gamma$-point data operation. Here, $\gamma$ refers to radix.

N-point FFT employs N/$\gamma$ butterfly units per stage (block) for $\log_\gamma$ N stage (hereinafter, "stage"). At this time, the operation result of a single butterfly stage is applied to a subsequent butterfly stage.

With regard to an N-point direct DFT (discrete Fourier transform), a basic equation is as follows.

$$X(K) = \sum_{n=0}^{N-1} x(n) W_N^{nk}, K = 0, 1, \ldots, N-1 \qquad (1)$$

wherein, n denotes time index, k denotes frequency index, N denotes point, and $W_N(=e^{-j(2\pi/N)})$ denotes twiddle factor.

Figure 1:
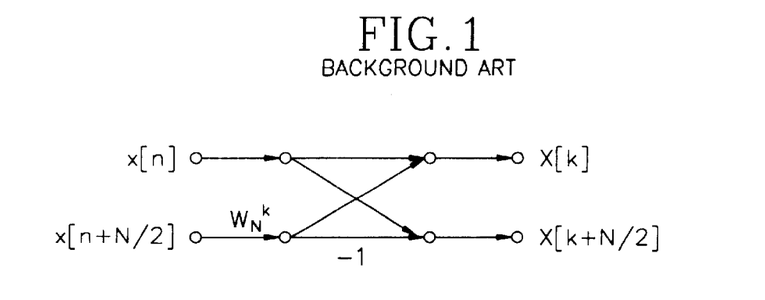
FIG. 1 is a signal flow view expressing an equation of a discrete Fourier transform (DFT) in a radix-2 butterfly.

FIG. 1 shows a basic construction of radix-2 butterfly unit expressing equation 1 by butterfly. The relations between input and output are as follows.

$$X[k] = x[n] + x[n+N/2] W_N^k$$

$$X[k+N/2] = x[n] - x[n+N/2] W_N^k$$

Figure 2:
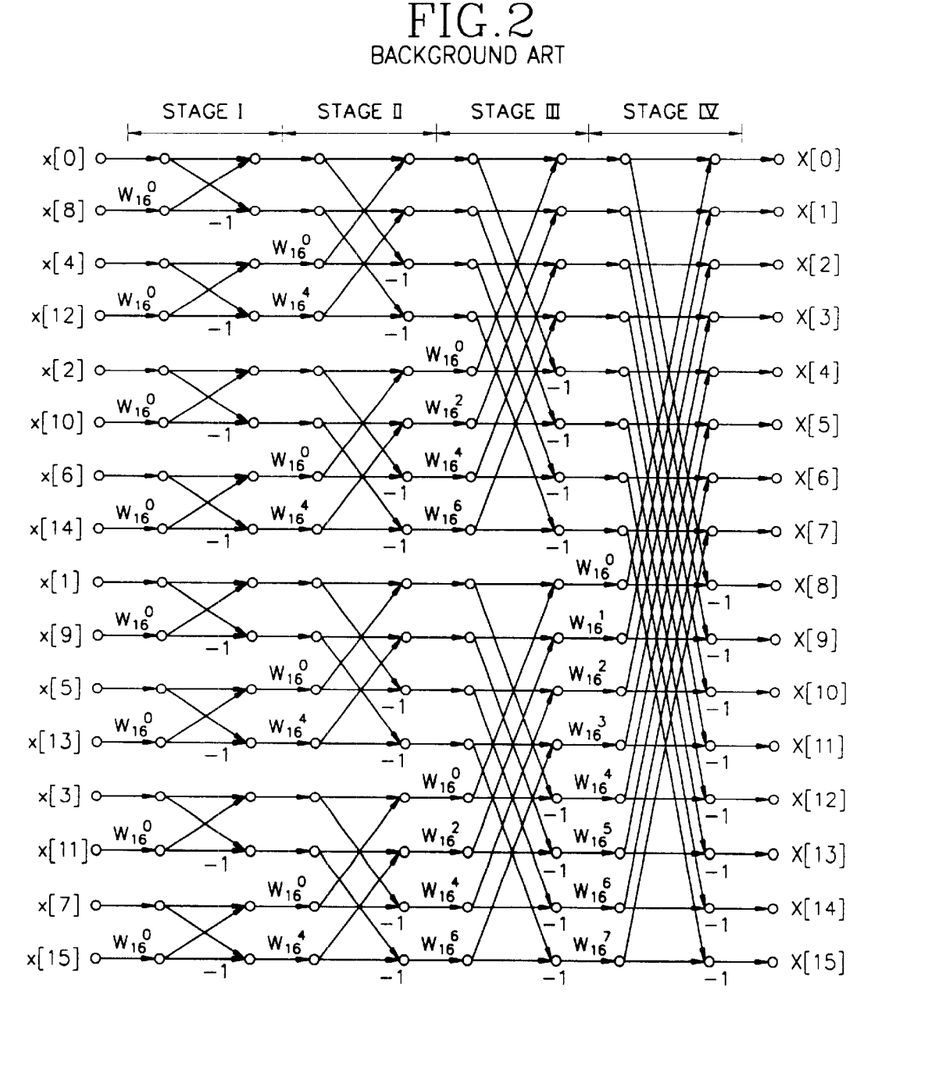
FIG. 2 is a signal flow view illustrating a 16-point radix-2 FFT processor.

FIG. 2 is a signal flow chart illustrating a 16-point radix-2 FFT processor. The butterfly operation of the 16-point FFT is implemented by 4 butterfly stages (blocks) I, II, III, IV and each stage includes 8 butterflies.

Figure 3:
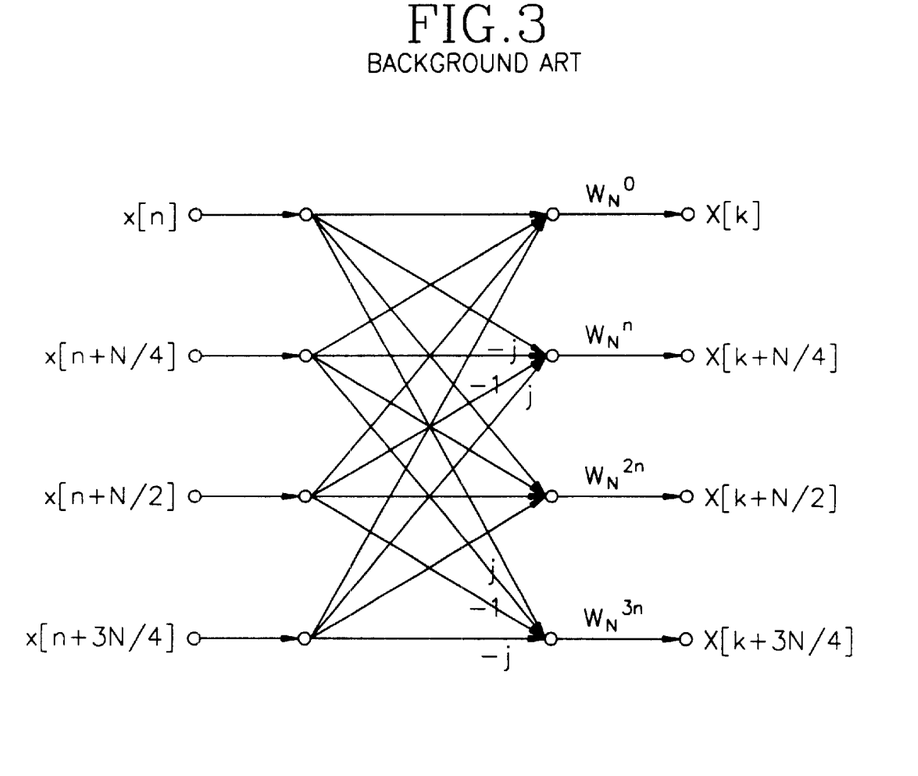
FIG. 3 is a signal flow view expressing an equation of a discrete Fourier transform (DFT) in a radix-4 butterfly.
Figure 4:
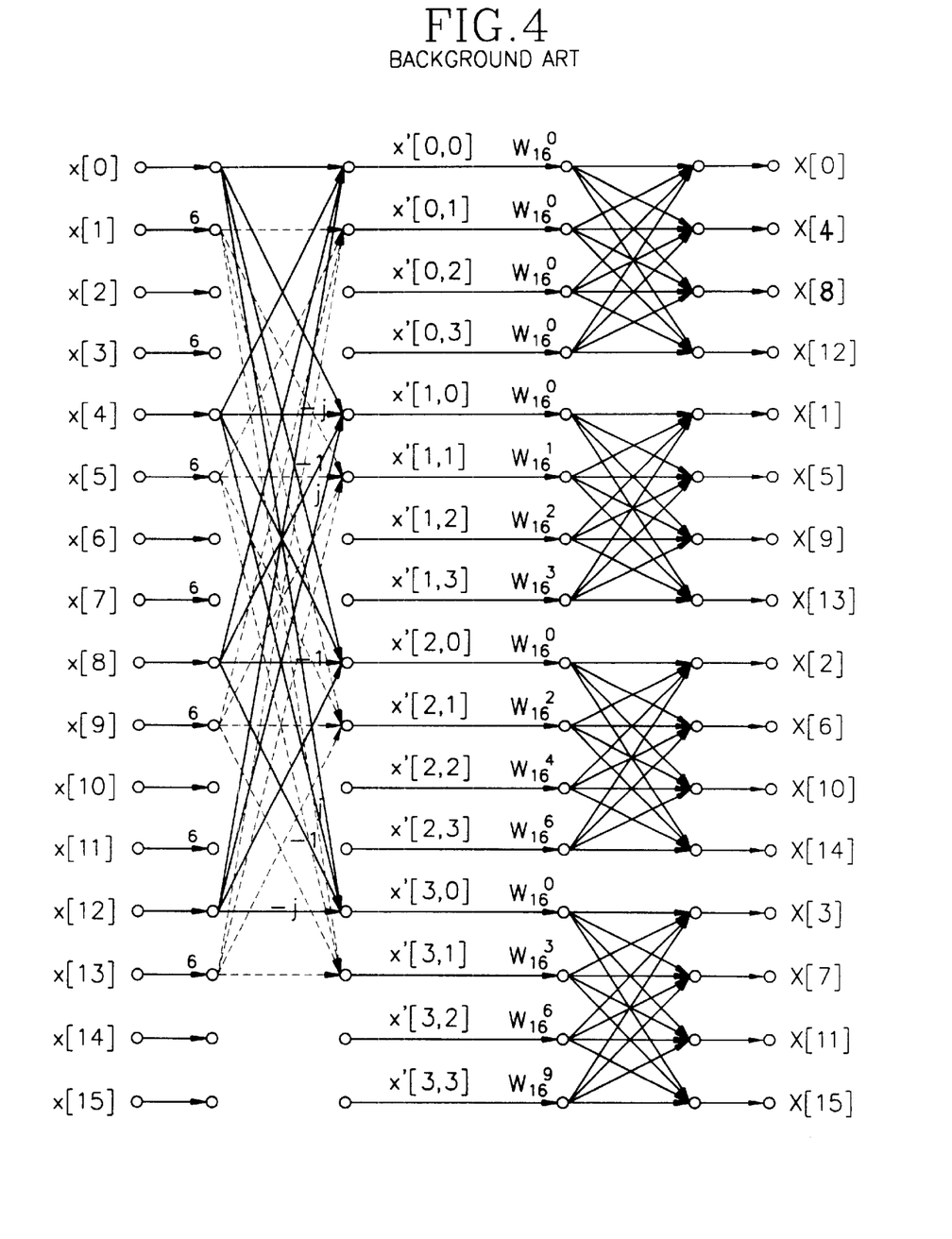
FIG. 4 is a signal flow view illustrating a 16-point radix-4 FFT processor.

Also, FIG. 3 is a signal flow chart illustrating a radix-4 butterfly unit implementing equation 1 by butterfly, and FIG. 4 is a signal flow chart illustrating a 16-point radix-4 FFT processor. The butterfly calculation of the 16-point FFT is performed by 2 butterfly stages and each stage includes 4 butterflies.

Such a butterfly operation using a Cooley-Tukey algorithm uses a "drive and conquer" method so that the calculation process can be decreased to N log N. However, when implementing the same in hardware, it becomes difficult to apply thereto a flexibility, regularity and in-place computation.

Figures 5, 6:
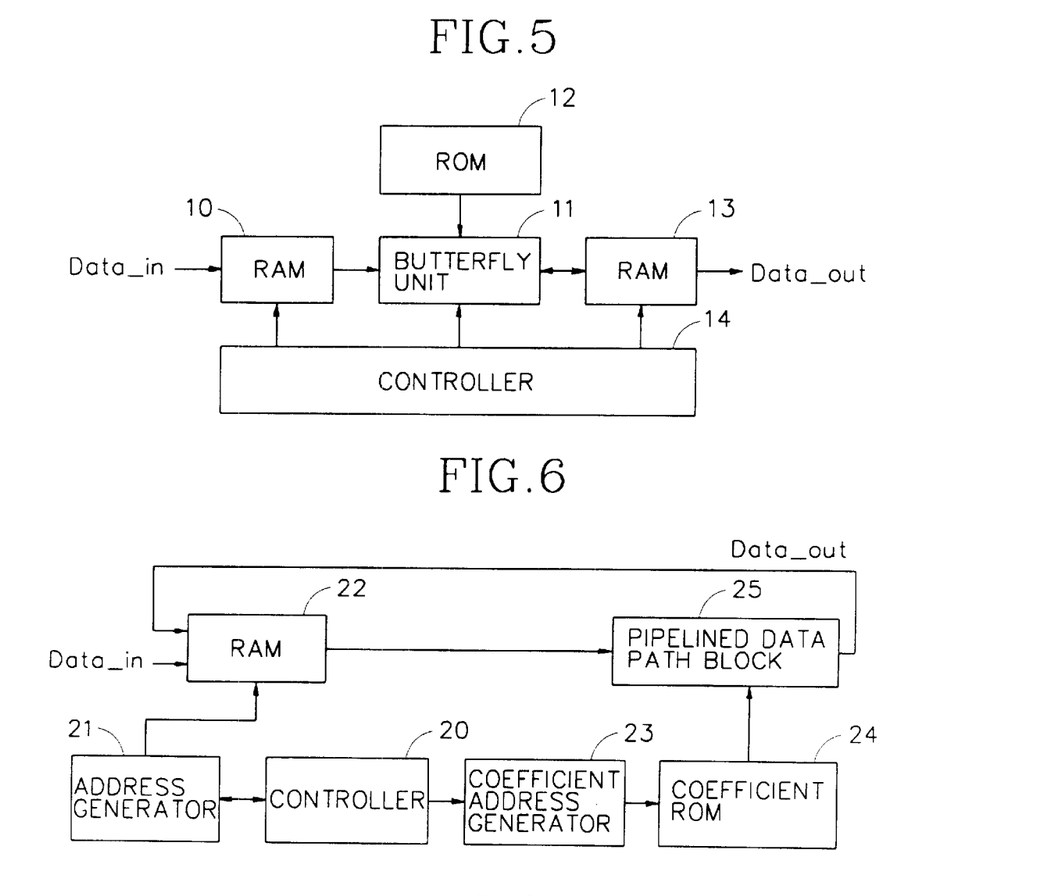
FIG. 5 is a schematic block diagram illustrating a conventional FFT processor having a single butterfly unit.
FIG. 6 is a schematic block diagram illustrating a conventional FFT pipelined mechanism for a radix-4 butterfly operation.

FIG. 5 is a schematic block diagram illustrating a conventional FFT processor having a single butterfly unit. As shown therein, RAM 10 serves to relocate an input data Data_in, RAM 13 stores therein an operation result of a butterfly unit 11. The RAMs 10, 13 respectively include an N-word RAM. The butterfly unit 11 includes complex number multipliers (4 multipliers and 2 adders) and 4 adders. ROM 12 stores therein a twiddle element $W_N^k$, and a controller 14 controls access operation of the RAMs 10, 13 and the butterfly operation of the butterfly unit 11.

Therefore, the butterfly unit 11 employs the access data of the RAM and the twiddle element read from the ROM 12 to perform a butterfly operation of N-point FFT, and the operation result is temporarily stored in the RAM 13. When all the butterfly operation is completed, the final output data Data_out is outputted from the RAM 13 in accordance with the control of the controller 14.

Here, although the conventional FFT processor is appropriate to a small point FFT operation, it is not suitable to a large point FFT calculation. This is because there are required number (N/$\gamma$)$\log_\gamma$ N of radix-$\gamma$ butterfly units for N-point FFT calculation and number 2N of RAMs for storing the intermediate data as a major factor determining a chip area during FFT processor fabrication. Also, there is required 2N $\log_\gamma$ N times of read/write access with regard to number 2N of RAMs. Accordingly, during the large point FFT fabrication and calculation the conventional FFT processor leads to a speed decrease and an area increase and in a worse case it may be impossible to realize a hardware implementation.

FIG. 6 is a schematic block diagram illustrating a conventional pipelined FFT processor for a radix-4 butterfly operation as disclosed in U.S. Pat. No. 5,163,017.

The pipelined FFT processor includes a RAM 22 for appropriately relocating input data in correspondence to a butterfly operation, a controller 20 for controlling the RAM 22 and an address generator 21, a coefficient ROM 24 for storing therein the twiddle element, a coefficient address generator 23 for controlling the coefficient ROM 24 and a pipelined data path block 25 for performing a butterfly operation. The pipelined FFT structure is provided such that a single butterfly calculation is implemented in a single pipelined cycle.

The operation of the thusly constituted conventional pipelined FFT processor will now be described.

The address generator 21 outputs a read/write address signal in accordance with a control signal from the controller 20, and the coefficient address generator 23 outputs the coefficient address signal to the coefficient ROM 24 so as to read the twiddle coefficient.

The RAM 22 relocates the input data Data_in in accordance with the write address signal of the address generator 23 and outputs 4 data to the pipelined data path block 25. The coefficient ROM 24 outputs two twiddle coefficients for the radix-4 butterfly operation in accordance with the coefficient address signal from the coefficient address generator 23. Here, the coefficient ROM includes two storage ROMs so as to simultaneously read two twiddle coefficients and three ROMs may be employed in case of simultaneously reading three twiddle coefficients.

Therefore, the pipelined data path block 25 employs the data accessed from the RAM 22 and two twiddle coefficients read from the coefficient ROM 24 and implements a butterfly operation with the provision of 16 addition/subtractions and 3 complex number multiplications. At this time, 3 complex number twiddle coefficients read from the coefficient ROM 24 are employed for the complex number multiplication and the output data Data_in generated from the respective butterfly operations are stored in the RAM 22.

As described above, the conventional pipelined FFT processor partially stores the input data Data_in and the output data Data_out in the RAM 22 so as to implement the butterfly operation. Accordingly, the above structure has an advantage for significantly saving memory (RAM) required to store the intermediate data when compared to the FFT processor as shown in FIG. 5.

However, the conventional FFT processor additionally requires the RAM 22 and the address generator 21 to relocate the input data Data_in and includes a complicated pipelined data path block 25 for enabling the butterfly operation. Here, the detailed description of the pipelined datapath block 25 will be omitted for convenience' sake. Also, eight pipelines should be passed in order to implement a single butterfly in the datapath block 25 so that there disadvantageously occur a plurality of pipeline delays.

A block floating point algorithm advantageously processes a block data at high speed and it is widely employed in butterfly operation. Since a general butterfly processor includes fixed-point multipliers and adders, a data range increases in accordance with the operation of multiplication, addition and subtraction, thereby generating an overflow. Accordingly, the overflow should be detected in order to appropriately shift the overflowed data.

Figure 7:
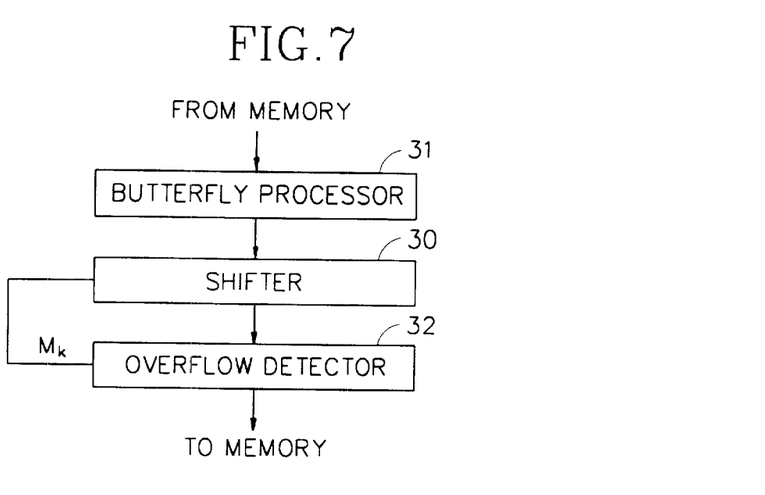
FIG. 7 is a schematic block diagram illustrating a conventional block floating point mechanism.

FIG. 7 is a schematic view illustrating a conventional block floating point mechanism. As shown therein, the block floating point mechanism includes a shifter 30, a butterfly processor 31 connected to the shifter 30 and an overflow detector 32 connected to the shifter 30 and the butterfly processor 31.

The shifter 30 receives a source data for operation from a memory (not shown). At this time, the source data for a butterfly operation of a first stage (block) is not shifted in the shifter 30 and instead transmitted directly to the butterfly processor 31. The butterfly processor 31 receives the source data and implements the butterfly operation, and the overflow detector 32 detects the overflow from the result data of the butterfly processor 31. Then, the last butterfly operation is completed, and when the overflow of the last result data is detected, the largest overflow bit number $M_1$ with regard to the first stage is applied from the overflow detector 32 to the shifter 30. The final result data of the butterfly operation at the first stage is transmitted to the memory so as to be employed as source data for the butterfly operation at the second stage (block).

Also, the shifter 30 receives the source data from memory for the butterfly operation of the second stage and shifts the received source data as much as the overflow bit number $M_1$. The shifted data is sent to the butterfly processor 31 for butterfly operation, and the result data of the butterfly processor 31 for obtaining the largest overflow bit number $M_2$ to be provided to the shifter 30 is detected by the overflow detector 32. The result data of the second stage butterfly operation is transmitted to the memory and serves as source data for a second stage butterfly operation. Those steps are repeated until all the stage butterfly operations are completed.

As described above, the conventional BTP (block floating point) mechanism introduces a processing method with regard to bits overflow by a multiplication and addition during a fixed point operation. In the BFP mechanism, the overflow of all the data in one block (stage) is examined so that all the other data is shifted as much as $M_k$ with the reference having a largest overflow $M_k$ so as to compensate for an overflow error which occurs in accordance with a calculation result of the butterfly. Also, the BFP construction has an advantage in that the butterfly operations of K−1 stage and K stage are instantly connected for thereby without requiring a pipeline waiting.

However, although the block floating point mechanism heightens accuracy of the FFT operation, when the block is large as the FFT operation of a large point (multi-step butterfly operation), the accuracy does not show a significant improvement.

SUMMARY OF THE INVENTION

Therefore, it is an object of the present invention to provide an FFT processor which enables effective management of an operation time while decreasing chip area, thereby implementing an improved pipelined mechanism.

It is another object of the present invention to provide a multi-functional FFT processor capable of implementing 2K-point butterfly operation and 8K-point butterfly operation.

It is further another object of the present invention to provide an FFT processor capable of implementing an FFT/reverse FFT operation.

It is still further another object of the present invention to provide an FFT processor capable of improving an output data reliability by implementing a convergent block floating point circuit using a floating point concept with regard to a fixed point data operation.

To achieve the above-described objects, there is provided a pipelined FFT (fast Fourier transform) processor including a CBFP (convergent block floating point) algorithm according to the present invention which includes an inverse multiplexer for inverse-multiplexing an 8K-/2K-point input data, a first to sixth radix-4 operation circuit for receiving an output of the inverse multiplexer and performing a butterfly operation, a multiplexer connected between the first and second radix-4 operation circuits and for selectively outputting an output of the inverse multiplier or a first butterfly unit, a radix-2 operation circuit connected to the sixth radix-4 operation circuit and for performing a butterfly operation, a convergent block floating point circuit connected to respective output terminals of the radix-4 operation circuit and the radix-2 operation circuit and for scaling a butterfly operation result, an addition circuit for accumulation and adding scaling indexes outputted from the convergent block floating point circuit, and a decoder for scaling an output of the radix-2 operation circuit in accordance with the scaling indexes outputted form the addition circuit.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS
Transformed Pipelined Construction In order to implement an 8K(8192)-point FFT processor, there are required 13 radix-2 operation steps ($2^{13}$) or 6 radix-4 operation steps ($4^6$) and finally one radix-2 of operation steps ($4^6 \times 2^1$). Also, in order to implement a 2K(2048)-point FFT processor there are required 11 radix-2 operation steps ($2^{11}$) or 5 radix-4 operation steps ($4^5$) and finally one radix-2 of operation steps ($4^5 \times 2^1$).

Figure 8:
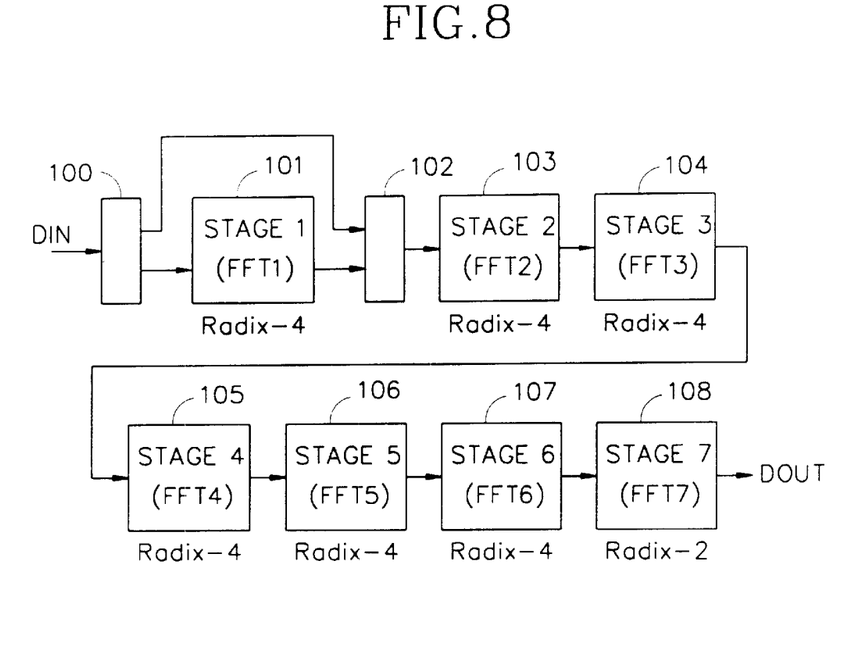
FIG. 8 is a schematic block diagram illustrating an FFT processor for combined use of 8K-/2K-point according to the present invention.

FIG. 8 is a schematic view of 8K/2K-point combined FFT processor according to the present invention. As shown therein, in order to decrease a circuit complexity, a composite-radix construction having a six radix-4 & one radix-2 construction is employed.

The FFT processor includes a reverse multiplexer 100, a multiplexer 102, six radix-4 butterfly units 101, 103–107 and one radix-2 butterfly unit 108 performing a radix-2 operation. The FFT processor employs a composite-radix construction, that is, a six radix-4 & one radix-2 construction, in case of a 8192-point mode. In case of a 2048-point mode, the first radix-4 butterfly unit 101 (stage 1) is excluded by the switching operation of the multiplexer 102. Accordingly, when the FFT processor is practically employed, it is preset for an 8K-point or 2K-point purpose in correspondence to a regional characteristic.

Figure 9:
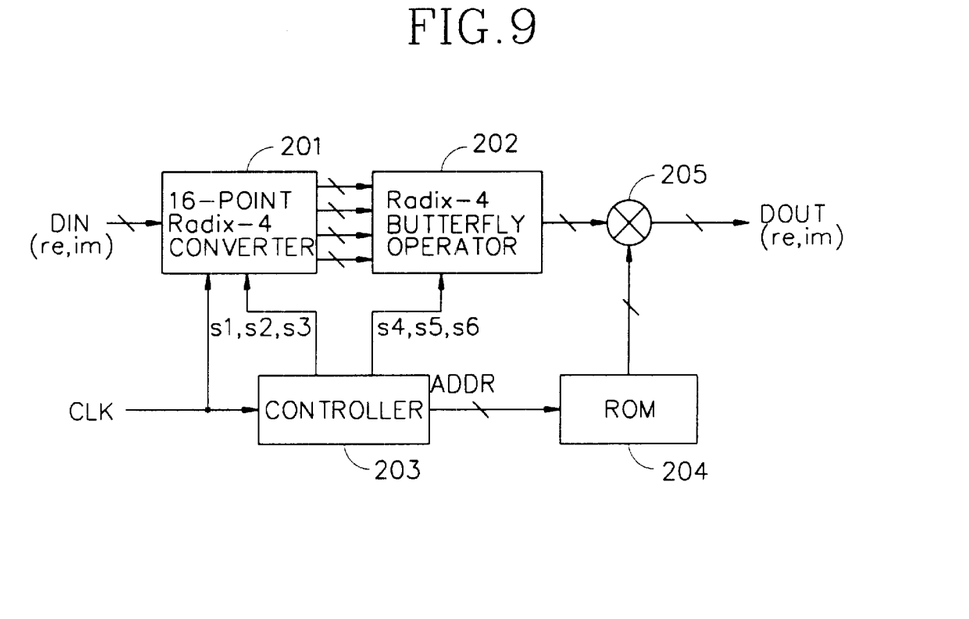
FIG. 9 is a block diagram illustrating a radix-4 butterfly unit in FIG. 8.

FIG. 9 is a schematic view illustrating respective stages (blocks) of a radix-4 FFT operation with regard to FFT processor in FIG. 8.

The respective radix-4 butterfly unit includes a 16-point radix-4 converter 201 for rearranging the input data DIN and outputting four data in accordance with control signals s1, s2, s3, a radix-4 butterfly operator 202 for receiving the output of the 16-point radix-4 converter 201 and performing a butterfly operation in accordance with control signals s4, s5, s6, a controller 203 for outputting the control signals s1–s6 and a ROM address ADDR by counting a clock signal CLK, a ROM 204 for outputting twiddle elements in accordance with the ROM address ADDR from the controller 203, and a complex number multiplier 205 for multiplying the output data of the radix-4 butterfly operator 202 and the twiddle elements from the ROM 204.

Figure 18:
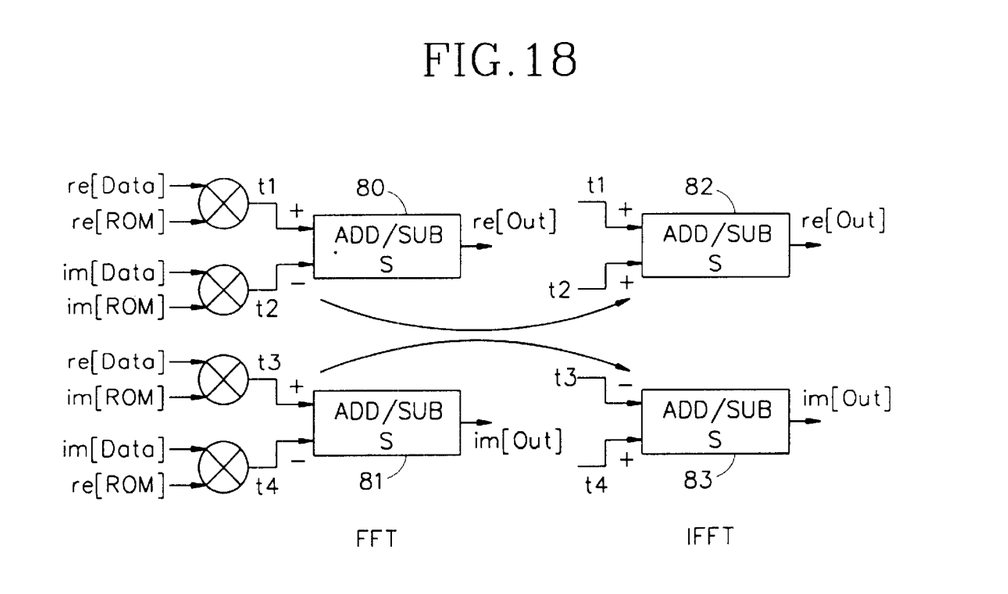
FIG. 18 is a view illustrating differences of complex numbers in FFT and IFFT (inverse fast Fourier transform) modes.

The complex number multiplier 205 includes four multipliers and two adders/subtractors as shown in FIG. 18, wherein the control signals s1–s6 are signals which vary every four clocks.

Therefore, at respective stages of the radix-4 FFT calculation, the 16-point radix-4 converter 201 serves to relocate the input data DIN and outputs four data. The four data are performed by the butterfly operation in the radix-4 butterfly operator 202. The complex number multiplier 205 multiplies the twiddle elements read from the ROM 204 under the control of the controller 203 by the output of the radix-4 butterfly operator 202 so that the result is transferred to the subsequent stage.

As shown in FIG. 4, the signal flow view of the basic radix-4 butterfly may be expressed as following equations:

$$X[0,a]=x[n]+x[n+N/4]+x[n+N/2]+x[n+3N/4] \tag{2}$$

$$X[1,a]=x[n]-jx[n+N/4]-x[n+N/2]+jx[n+3N/4] \tag{3}$$

$$X[2,a]=x[n]-x[n+N/4]+x[n+N/2]-x[n+3N/4] \tag{4}$$

$$X[3,a]=x[n]+jx[n+N/4]-x[n+N/2]-jx[n+3N/4] \tag{5}$$

wherein, a denotes a dummy index representing a random number.

Accordingly, when applying the above equations to the calculation of the 16-point radix-4 processor as shown in FIG. 4, it is known that the upper four outputs {x'[0,0], x'[0,1], x'[0,2], x'[0,3]} of stage 1 are calculated by equation 2. That is, the x'[0,0] is calculated by the inputs {x[0], x[4], x[8], x[12]} and the x'[0,1] is calculated by the inputs {x[1], x[5], x[9], x[13]}. Also, x'[0,2], x'[0,3] are calculated similarly.

The subsequent four outputs {x'[1,0], x'[1,2], x'[1,3], x'[1,3]} are calculated by equation 3. At this time, the respective inputs employ the inputs used at equation 2.

Figure 10:
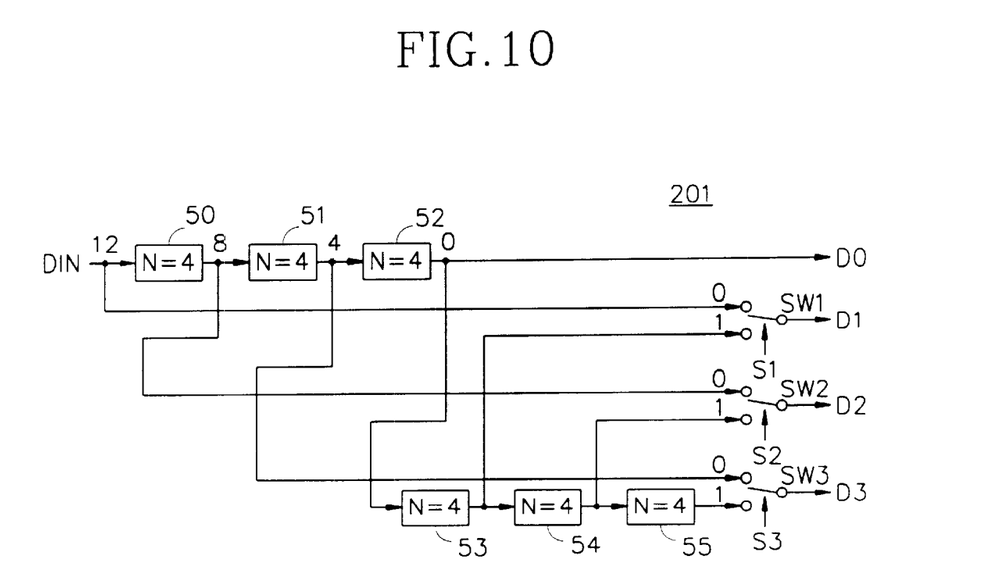
FIG. 10 is a block diagram illustrating a 16-point radix-4 converter in FIG. 9.

As shown in FIG. 10, the present invention using such characteristics has realized a 16-point radix-4 converter 201. The 16-point radix-4 converter 201 includes 6 delay units 50–55 and 3 switches SW1–SW3. The respective delay units each include 4 registers (delay rate: 4 clocks). Therefore, the switches SW1–SW3 apply identical data up to 4 times to the radix-4 butterfly operator 202 per four clocks in accordance with the control signals s1, s2, s3 from the controller 203. As a result, since the present invention provides the radix-4 converter 201 including delay units 50–55 and eliminates RAM conventionally required for relocation of input data and subsidiary dummy logic (address generator), etc., thereby decreasing chip area and operation time.

Figure 11:
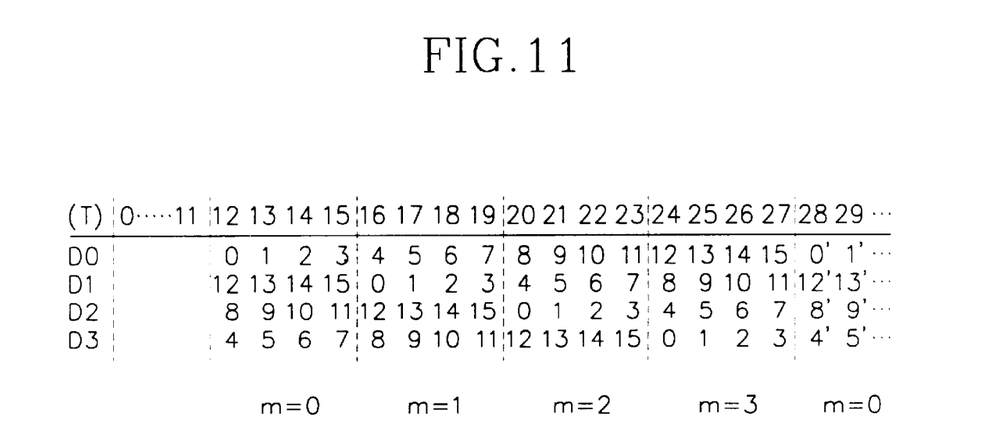
FIG. 11 is a table illustrating a data relocation of 16-point converter in correspondence to clock timing in FIG. 10.

FIG. 11 is a view illustrating a data relocation process of the 16-point radix-4 converter in accordance with a clock timing T in one stage of the radix-4 FFT.

Since the respective registers of the delay units in FIG. 10 shift the input data DIN each cycle of the clock signals CLK, the respective delay units output data per four clock cycles of the clock signals CLK. Therefore, when the 16-point data 0–15 are sequentially applied to the delay units 50–55, the data "0" appears for the first time at an output terminal of the delay unit 50 after 12 clocks.

That is, when the timing of the clock CLK is 12T (m=0), the data "12" shows up at an input terminal of the delay unit 50, and the data "8", "4", "0" appear at the output terminals of the delay unit 50–52. Accordingly, the controller 203 starts outputting the control signals s1, s2, s3 of 0, 0, 0 to the switches SW1–SW3 from a start point at which the timing of the clock signal CLK becomes 12T (m=0) so as to vary the control signals s1, s2, s3 per four cycles of the click signal CLK. The respective levels of the varied control signals s1, s2, s3 are as shown in Table 1.

TABLE 1

| m | s1 | s2 | s3 |
|---|----|----|----|
| 0 | 0  | 0  | 0  |
| 1 | 1  | 0  | 0  |
| 2 | 1  | 1  | 0  |
| 3 | 1  | 1  | 1  |

As a result, the switches SW1–SW3 output d0, d12, d8, d4 as outputs D0–D3 in accordance with the control signals s1, s2, s3 at 12T. According to the identical method, the outputs D0–D3 of the switches SW1–SW3 become d1, d13, d9, d5 at 13T, and the outputs D0–D3 at 14T become d2, d14, d10, d6. The outputs D0–D3 of the switches SW1–SW3 become d3, d15, d11, d7 at 15T.

Then, if the timing of the clock signal CLK becomes 16T (m=1), the control signals s1, s2, s3 are varied to 1, 0, 0 and accordingly the outputs D0–D3 of the switches SW1–SW3 with regard to 16T–19T are determined. Likewise, when the timing becomes 20T (m=2), the controller 203 varies the control signals s1, s2, s3 to 1, 1, 0. When the timing is 24T(m=3), the control signals s1, s2, s3 are varied to 1, 1, 1 and become reset. As a result, the outputs D0–D3 of the switches SW1–SW3 in the 16-point radix-4 converter are as shown in FIG. 11 in accordance with the timing of the clock signal CLK.

As described above, the 16-point radix-4 converter 201 applies the identical data to the butterfly operator 202 up to four times per four clock cycles so as to relocate the input data DIN.

Figure 12:
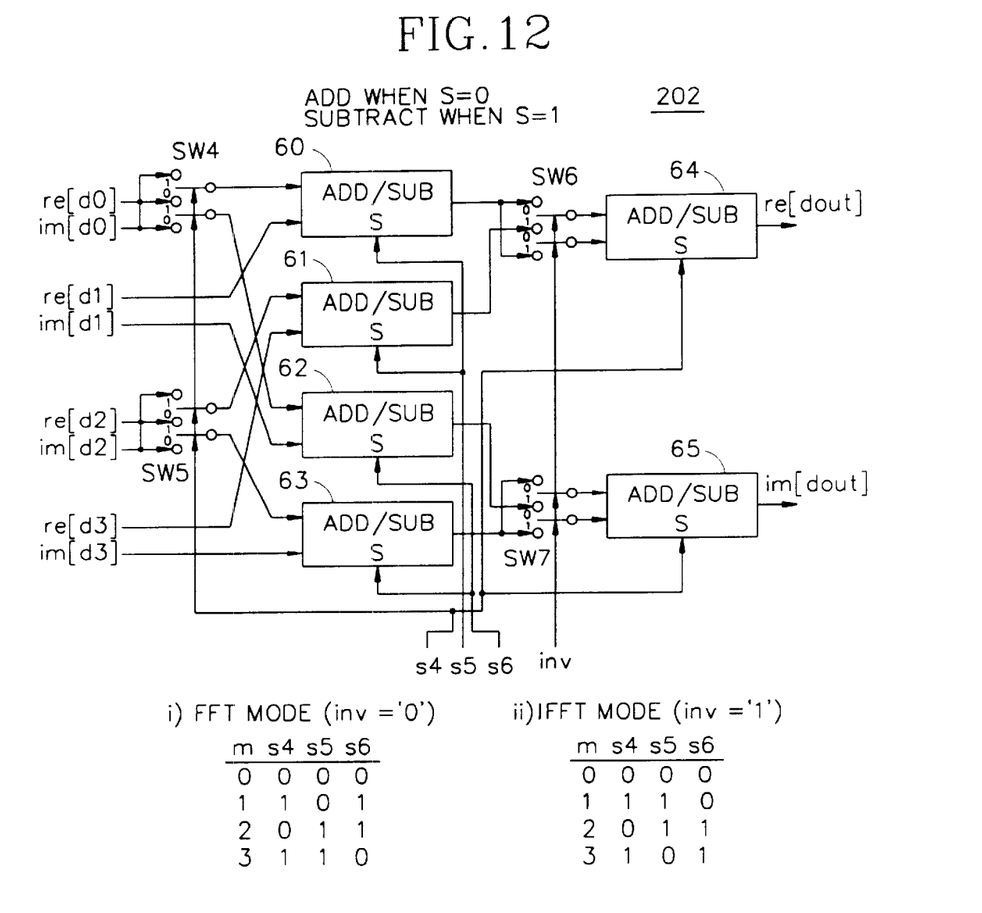
FIG. 12 is a block diagram illustrating the radix04 butterfly operator in FIG. 9.

FIG. 12 shows an embodiment of the radix-4 butterfly operator 202 which performs the butterfly operation by receiving the data relocated at the 16-point radix-4 converter 201. The 16-point radix-4 butterfly operator 202 includes a plurality of adders/subtractors 60–65 and switches SW4–SW7 which are all applicable to an FFT/inverse FFT processor having a pipelined structure.

The adders/subtractors 60–65 operate as addresses when the control signal applied to the selection terminal S is "0"and operate as subtractors when the control signal is "1". The mode control signal INV becomes "0" in an FFT mode and "1" in an IFFT mode.

If the timing of the clock signal CLK becomes 12T (m=0), the data outputted from the 16-point radix-4 converter 201 become d0, d12, d8, d4, and the control signals s4, s5, s6 outputted from the controller 203 become 0, 0, 0. Therefore, when in FFT mode, the outputs [re(out), im(out)] of the butterfly operator 202 become as equation 6 in accordance with the levels of the control signals s4, s5, s6 as shown in Table 2.

TABLE 2

| FFT mode (INV = 0) | | | |
|---|---|---|---|
| m | s1 | s2 | s3 |
| 0 | 0 | 0 | 0 |
| 1 | 1 | 0 | 0 |
| 2 | 1 | 1 | 0 |
| 3 | 1 | 1 | 1 |

$$re(out)=re(d0)+re(d12)+re(d8)+re(d4)$$

$$im(out)=im(d8)+im(d4)+im(d0)+im(d12) \qquad (6)$$

As a result, the operation result of equation 6 becomes identical to that of equation 2. At this time, the respective adders/subtractors 60–65 are operated as adders in accordance with the control signals s4, s5, s6 of 0, 0, 0 applied to the selection terminal S.

When the timing of the clock signal CLK becomes 16T (m=1), the data outputted from the 16-point converter 201 become d4, d0, d12, d8, and the control signals s4, s5, s6 outputted from the controller 203 become 1, 0, 1. Therefore, when in FFT mode, the outputs [re(out), im(out)] of the butterfly operator 202 become as follows.

$$re(out)=im(d4)+re(d0)30\ re(d12)-re(d8)$$

$$im(out)=im(d12)+im(d8)+im(d4)-im(d0) \qquad (7)$$

Also, when the timing of the clock signal CLK becomes 20T (m=2), the inputs of the butterfly operator 202 becomes d8, d4, d0, d12, and the outputs [re(out), im(out)] become as follows.

$$re(out)=re(d8)-re(d4)+re(d0)-re(d12)$$

$$im(out)=im(d0)-im(d12)+im(d8)-im(d4) \qquad (8)$$

Finally, when the timing of the clock signal CLK becomes 24T (m=3), the inputs of the butterfly operator 202 becomes d12, d8, d4, d0, and the outputs [re(out), im(out)] become as follows.

$$re(out)=im(d12)-re(d8)-re(d4)+re(d0)$$

$$im(out)=re(d4)+im(d0)-re(d12)-im(d8) \qquad (9)$$

As a result, the above three sorts become identical to equations 3–5.

Figure 13:
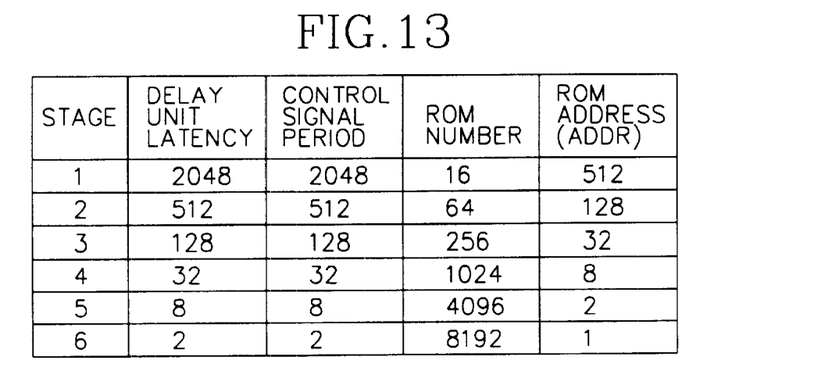
FIG. 13 is a table illustrating arrangement of major parameters per stage in the radix-4 butterfly unit in FIG. 8.

In order to calculate the FFT of the 8192-point, there are required 6 radix-4 stages and finally one radix-2 stage. Therefore, at the radix-4 stage, the main parameters are converted to correspond to the stages, thereby composing up to six stages as shown in FIG. 13.

At stage 1, the 16-point radix-4 converter 201 includes 6 delay units 50–55 having 2K (2048) latencies and the control signals s1–s6 generated from the controller 203 have 2K (2048) cycles. Also, a number 16 of ROMs 204 storing therein twiddle elements are provided including 1+j0. The ROM address is increased by 512 clocks. Likewise, in stages 2–6, parameters are varied in accordance with the rules as shown in FIG. 13.

Figure 14:
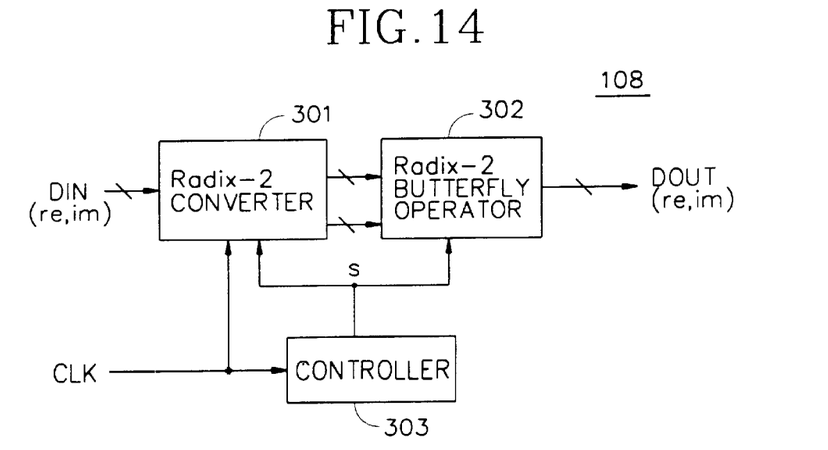
FIG. 14 is a block diagram illustrating a radix-2 butterfly unit in FIG. 8.

FIG. 14 is a schematic view of the radix-2 butterfly unit 108 in FIG. 8. As shown therein, the butterfly unit 108 includes a radix-2 converter 301, a radix-2 butterfly unit 302 and a controller 303. Here, since the twiddle elements are not employed in the radix-2 operation structure, ROMs and complex number multipliers are not employed.

Figure 15:
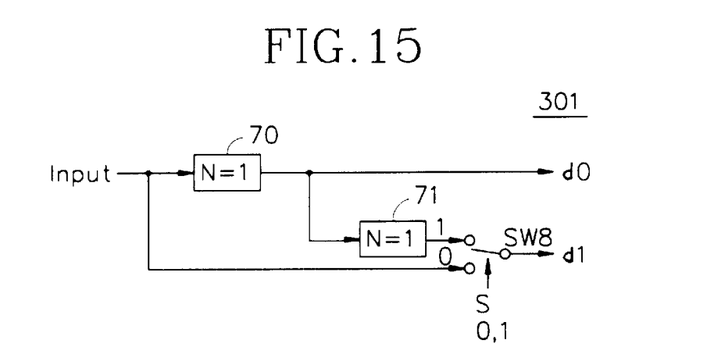
FIG. 15 is a block diagram illustrating the radix-2 converter in FIG. 14.
Figure 16:
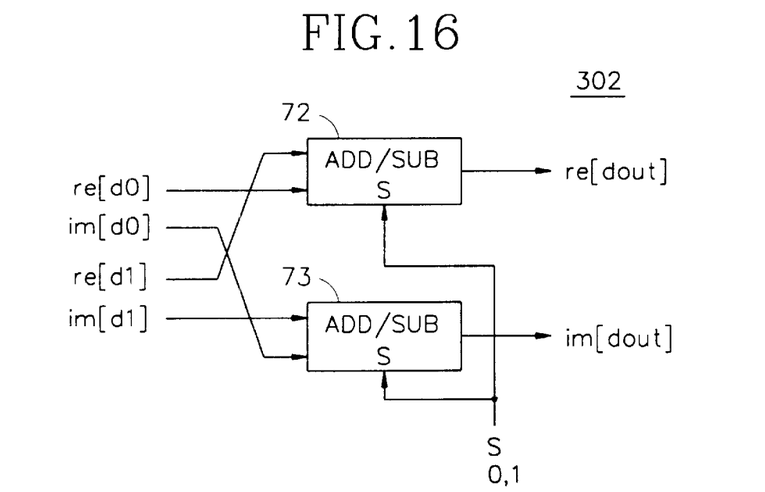
FIG. 16 is a block diagram illustrating the radix-2 butterfly operator in FIG. 14.

As shown in FIG. 15, the radix-2 converter 301 includes two delay units 70, 71 having one register, and the butterfly operator 302 includes two adders/subtractors 72, 73 for adding/subtracting the output of the radix-2 converter 301 in accordance with the control signal S. The adders/subtractors 72, 73 are operated as adders when the control signal applied to the selection terminal S is "0" and as subtractors when the control signal applied to the selection terminal S is "1".

8K/2K-Point Dual FFT Mechanism

As shown in FIG. 8, the operation of 2K-point operation does not require an additional hardware and instead a first radix-4 stage, that is, a butterfly unit 101 is omitted at the 8K-point operation. Also, the ROM address at the 2K-point operation only generates ¼ of the 8K-point operation.

That is, the twiddle element should be varied at the 2K-point operation and it is similar to upper ¼ of the ROM address employed at 8K-point per stage. As a result, the twiddle elements at the first stage of 2K-point become identical to those stored in upper 16 ROMs among 64 ROMs. Therefore, in case of 8K-point, the controller 203 counts 128 clocks and generates 64 ROM addresses (128× 64) so that it is changed to generate 16 ROM addresses per 128 clocks at 2K. Also, the controller 203 in case of 2K-point generates upper ¼ of the ROM addresses generated from 8K-point.

FFT/IFFT Dual FFT Mechanism

With regard to the equation of IFFT (inverse discrete Fourier transform), an imaginary portion numeral of the complex number of a forward direct DFT equation as shown in equation 1 is changed.

$$x(n) = \frac{1}{N}\sum_{k=0}^{N-1} X(k)W_N^{nk}, n = 0, 1, \ldots, N-1 \quad (10)$$

wherein, $W_N$ equals $e^{-j(2\pi/N)}$.

Figure 17:
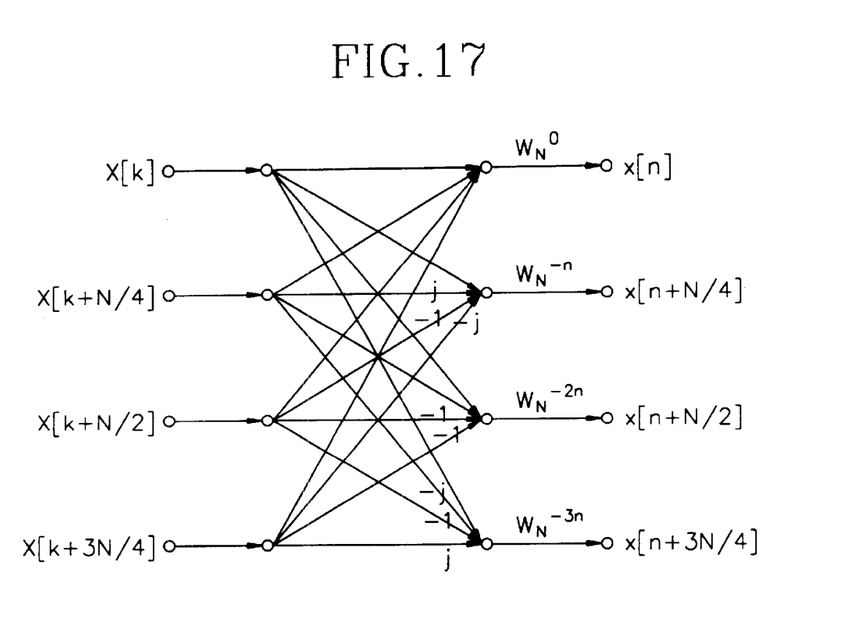
FIG. 17 is a signal flow view expressing an equation of an inverse discrete Fourier transform (IDFT) in a radix-4 butterfly unit.

FIG. 17 is a signal flow chart implemented in radix-4 butterfly unit with regard to equation 10 and it can be further implemented as follows:

$$X[0,a]=x[k]+x[k+N/4]+x[k+N/2]+x[k+3N/4] \quad (11)$$

$$X[1,a]=x[k]+jx[k+N/4]-x[n+N/2]-jx[n+3N/4] \quad (12)$$

$$X[2,a]=x[k]-x[k+N/4]+x[k+N/2]-x[k+3N/4] \quad (13)$$

$$X[3,a]=x[k]-jx[k+N/4]-x[k+N/2]+jx[k+3N/4] \quad (14)$$

Comparing equations 11–14 with the previous equations 2–5, the FFT operation and IFFT operation, it is known that the imaginary portion numerals of the FFT operation and IFFT operation are different.

Accordingly, in order to implement the IFFT in hardware using the above characteristics, as shown in FIG. 17, (1) the coefficients of radix-4 butterfly operator 202 should be complex-conjugated (j→−J) and then (2) the imaginary portion numerals of the twiddle elements should be changed ($W_N^n \rightarrow W_N^{-n}$). First, in case of (1), as shown in FIG. 12, the radix-4 butterfly operator 202 is operated in IFFT mode. That is, the mode control signal INV is set as 1 and the control signals s4, s5, s6 outputted from the controller 203 are varied. At this time, the respective levels of the control signals s4, s5, s6 in IFFT mode are in Table 3.

TABLE 3

| | IFFT mode (INV = 1) | | |
|---|---|---|---|
| m | s1 | s2 | s3 |
| 0 | 0 | 0 | 0 |
| 1 | 1 | 1 | 0 |
| 2 | 0 | 1 | 1 |
| 3 | 1 | 0 | 1 |

Therefore, comparing the respective levels of the control signals in FFT mode and IFFT mode with regard to Tables 1 and 2, the control signals s4, s5, s6 in case of m=1 and the control signals s4, s5, s6 in case of m=3 are exchanged. Accordingly, the controller 203 in IFFT mode in case of m=1 exchanges the control signals s4, s5, s6 in case of m=1 with the control signals s4, s5, s6 in case of m=3 and then the mode selection signal (inv=1) is converted.

In case of (2), in order to transform the imaginary portion of the twiddle elements stored in the ROM into 2's complement, there is required an additional adder (−a=/a+1). However, according to the present invention, instead of adding an additional hardware, a complex number multiplier 205 is changed so as to decrease the loss at the hardware and the multiplier 205. That is, as shown in FIG. 18, the adders/subtractors 80 of the complex number multiplier 205 in FFT mode are converted as the adders/subtractors 82, 83 in IFFT mode. The control signal applied to the selection terminal S is converted so that the adders/subtractors 80 which have been operated as subtractors in FFT mode are operated as adders in IFFT mode. The transforming of the complex number multiplier 205 is contrived from an idea that the value of im(ROM) is converted to −im (ROM).

Convergent Block Floating Point (CBFP) Mechanism

As described above, when a FFT processor is designed, the operations such as fixed point multiplication and addition serve to increase bit number of result data. At this time, in order to maintain an accuracy of the operation result, the larger is the bit number of internal data, the better. However, due to the memory size of its storage there is required an appropriate tradeoff between accuracy and area.

The conventional block floating point mechanism as shown in FIG. 7 is a method directed to perform scaling of data with reference to the biggest value thereamong. Under such a method, due to the waiting time until a number N of data are outputted, there is required a memory in order to store an intermediate data, thereby significantly decreasing efficiency in terms of timing. Also, although the block floating point mechanism improves accuracy of the FFT operation result, the accuracy is not desirably increased in case that the a block is large such as FFT operation of a large point (multi-stepped butterfly operation). Accordingly, the present invention introduces a floating point concept to the operation of the fixed point data so as to improve the accuracy of operation data.

Figure 19:
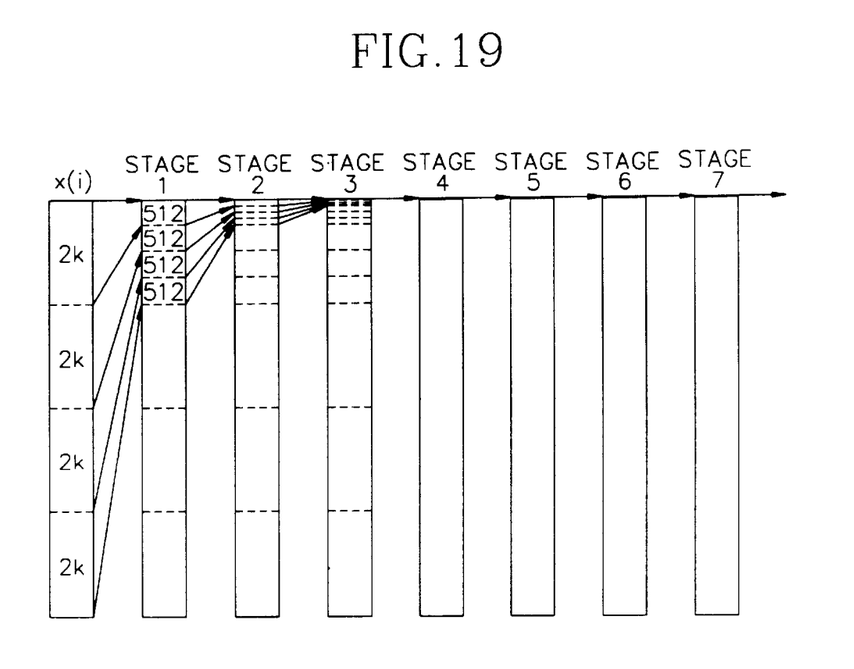
FIG. 19 is a view illustrating data processing steps in an radix-4 FFT operation.

FIG. 19 shows data processing steps of 8K-point radix-4 FFT operation. As shown therein, it is understood that the first N/4 output operation at state 2 is only dependant upon the first N/4 output at stage 1. That is, as shown in FIG. 4, the output X[0] at stage 2 depends only on x'(0,0), x'(0,1), x'(0,2), x'(0,3).

First, the calculation with regard to 8K-point input x(i) is carried out by the conventional block floating point mechanism and when the upper N/4 at stage 1 is outputted according to the calculation, the largest value (scaling index) is detected from the first N/4 block (512) existing within stage 1, and with reference to the detected value all the data are scaled. The identical steps are carried out with regard to the second and third N/4 block 512 existing at stage 1. Accordingly, when the upper N/4 result of stage 1 is outputted, four scaling indexes are detected with regard to the four N/4 blocks 512.

At stage 2, a scaling index is searched per N/16 block so as to process data. Accordingly, the respective stages perform the scaling with regard to the output of the radix-4 butterfly unit using the same method as above. The operation result is converged to one point so that such a method is referred to as a convergent block floating point (CBFP).

Figure 20:
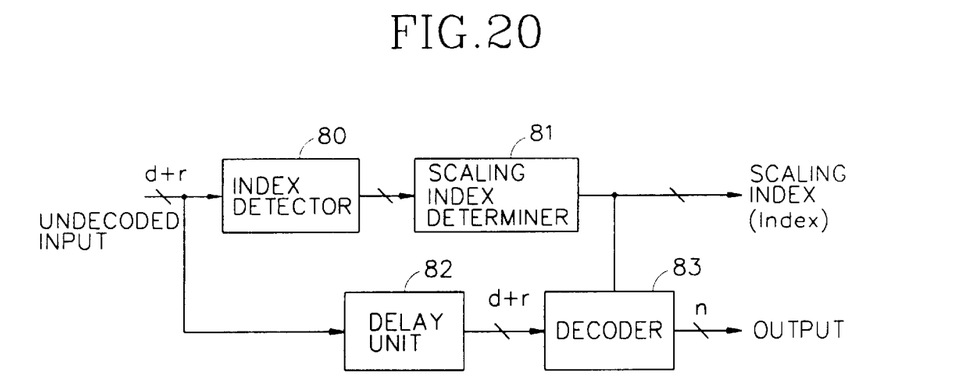
FIG. 20 is a block diagram illustrating a convergent block floating point (CBFP) circuit according to the present invention.

FIG. 20 is a block diagram of CBFP implementing the data processing steps in FIG. 19.

An index detector 80 serves to detect the index from the data outputted from the respective stages. That is, assuming that input data bit number is "d" and ROM output data is "r" bits, the output data of the complex number multiplier 205 becomes "d+r" bits, which are counted as "0" or "1" identical to sign bit for thereby determining index. For example, only −5 is detected from $1.xxxxx \times 10^{-5}$.

An index determiner 81 stores therein the index received from the index detector 80 as a temporary index index_tmp, and the stored temporary index index_tmp is compared with a subsequent temporary index index_tmp and selects the smaller of the two. As a result, with regard to a reference frame, the smallest index is determined as a scaling index during the process. At this time, assuming that the input data x(i) is 8K, the reference frame of the upper N/4 output at stage 1 becomes 512 bits respectively, and the reference frame of the upper N/4 output at stage 2 becomes 128 bits respectively. Likewise, reference frames at states 3–7 are determined in the same way. The delay unit 82 delays the "d+r"-bit data outputted from the complex number multiplier 205 while the index detector 80 and the scaling index determiner 81 start. The decoder 83 decodes the "d+r"-bit data delayed at the delay unit 82 to the scaling index determined in the scaling index determiner 81. As a result, the data outputted from the complex number multiplier 205 scales the frame data with reference to the smallest temporary scaling index (smallest data) per frame.

Figure 21:
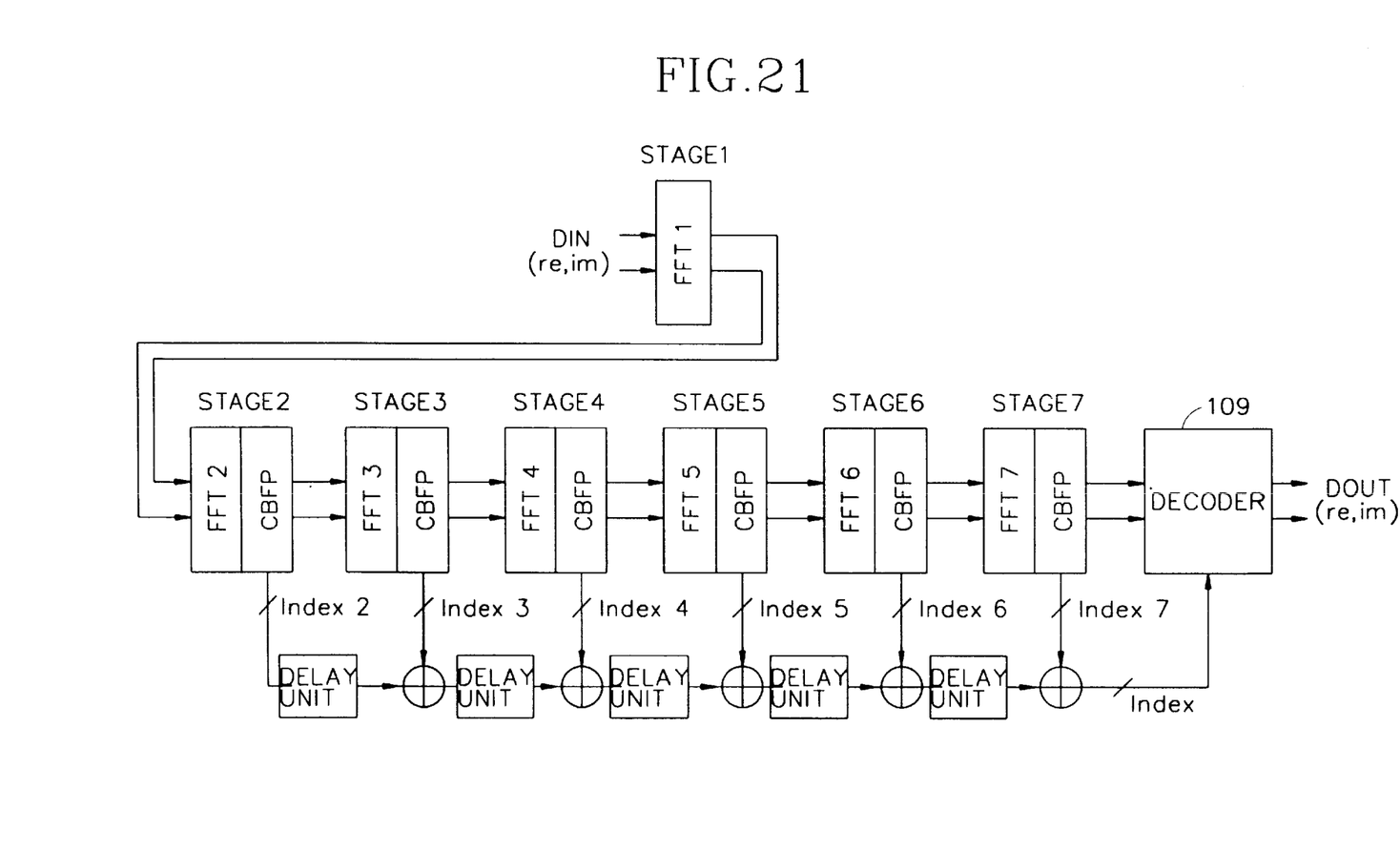
FIG. 21 is a block diagram illustrating accumulation of scaling index in FIG. 20.

FIG. 21 is a schematic view with regard to the accumulation of the scaling indexes index2–index7 detected at states 2–7. The scaling indexes index2–index7 detected from the respective stages are sequentially accumulated through the delay unit and the adder and become a final scaling index. Therefore, the decoder 109 compensates the data outputted from the CBFP circuit CBFP7 at the final stage 7 as a final scaling index for thereby obtaining a final output data DOUT.

Here, at stage 1 the CBFP circuit is not included. This is because at stage 1 as shown in FIG. 19 N outputs with regard to all the input data are calculated and then the scaling coefficient is detected for thereby serving to be the same as the conventional BFP. Also, CBFP circuit at stage 1 does not significantly influence on its accuracy, it is omitted for optimization of entire hardware area.

Figure 22:
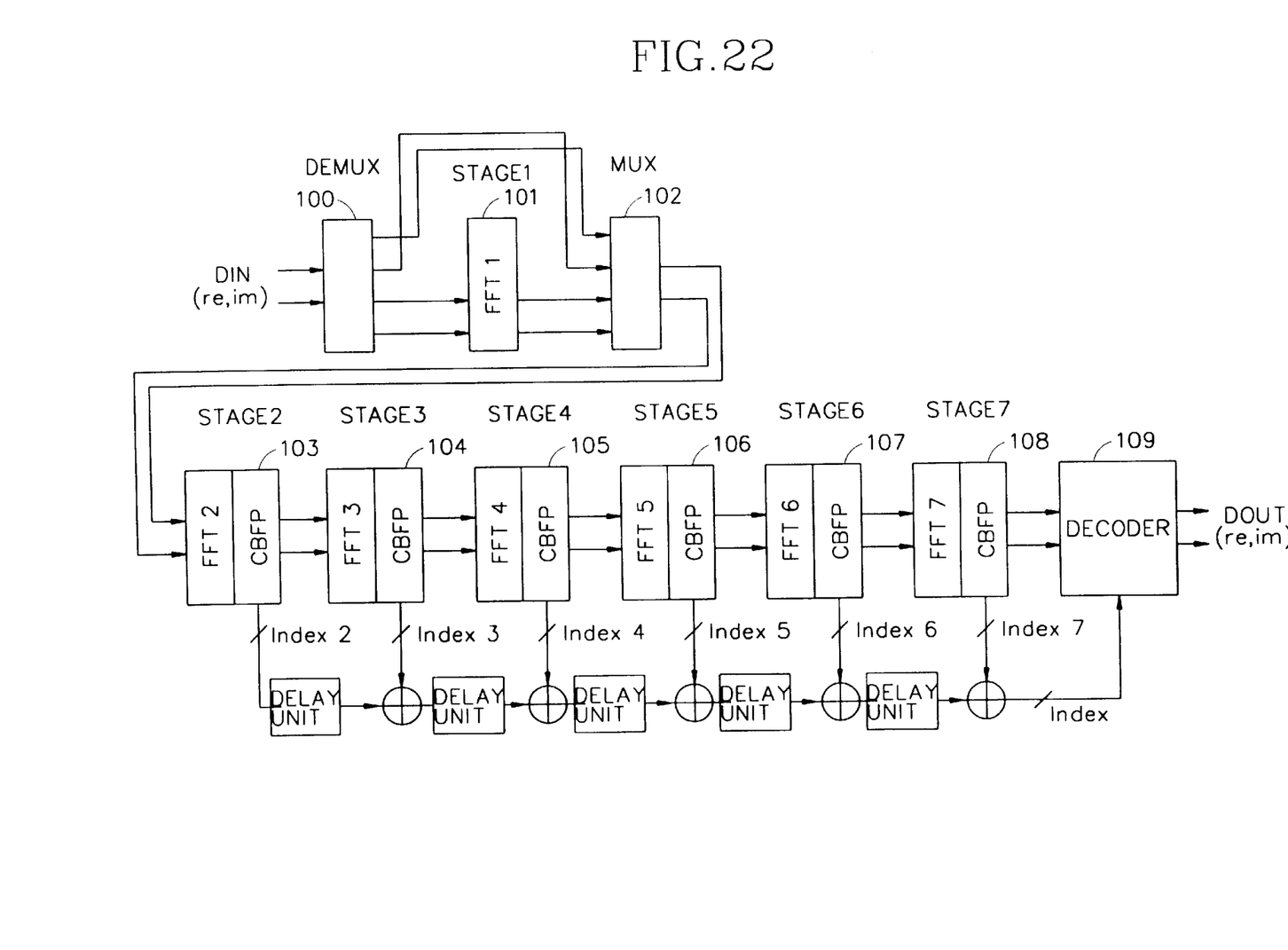
FIG. 22 is a block diagram illustrating a 2K/8K-point direct/inverse combined pipelined FFT processor having a CBFP algorithm according to the present invention.

FIG. 22 is a block diagram of 2K-/8K-point, direct/inverse dual pipelined FFT processor having the CBFP algorithm according to the present invention. The operation of the respective portions is as described above and omitted, accordingly.

As described above, the present invention provides an improved pipelined structure. The additional hardware (RAM, address generator, etc.) conventionally employed for relocation of the conventional input data and storage of intermediate data may be eliminated, thereby reducing chip area and enabling an effective management of operation time.

Further, the present invention implements an FFT processor which enables a dual use of 2K/8K-point and FFT/IFFT, thereby realizing a multi-functional processor without requiring separate hardware.

Still further, the present invention implements a convergent block floating point circuit and realizes an improved accuracy in comparison to the conventional block floating point circuit.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A pipelined FFT (fast Fourier transform) processor including a CBFP (convergent block floating point) algorithm, comprising:

an inverse multiplexer for inverse-multiplexing an 8K-/2K-point input data;

a first to sixth radix-4 operation circuit for receiving an output of the inverse multiplexer and performing a butterfly operation;

a multiplexer connected between the first and second radix-4 operation circuits and for selectively outputting an output of the inverse multiplexer or a first butterfly unit;

a radix-2 operation circuit connected to the sixth radix-4 operation circuit and for performing a butterfly operation;

a convergent block floating point circuit connected to respective output terminals of the radix-4 operation circuit and the radix-2 operation circuit and for scaling a butterfly operation result;

an addition circuit for accumulation and adding scaling indexes outputted from the convergent block floating point circuit; and a decoder for scaling an output of the radix-2 operation circuit in accordance with the scaling indexes outputted form the addition circuit.

2. The processor of claim 1, wherein the multiplexer selects an output of the first radix-4 operation circuit in case of 8K-point and selects an output of an inverse multiplexer in case of 2K-point.

3. The processor of claim 1, wherein the radix-4 operation circuit comprises:

a first controller for counting clock signals and outputting first to sixth control signals and ROM addresses;

a 16-point radix-4 converter for relocating an input data in accordance with the first to third control signals;

a radix-4 butterfly operator for receiving an output of the 16-point radix-4 converter and performing a butterfly operation in accordance with the fourth to sixth control signals;

a ROM for storing therein twiddle elements; and a complex number multiplier for an operation result of the radix-4 butterfly operation and the twiddle elements outputted from the ROM.

4. The processor of claim 3, wherein the first controller counts the clock signals and varies respective levels of the first-third control signals and the fourth to sixth control signals per four clocks at time point when the timing of the clock signal becomes 12T and is reset at time point when the timing of the clock signal becomes 28T.

5. The processor of claim 4, wherein a first type of the first to third control signals is 0, 0, 0, a second type thereof is 1, 0, 0, a third type thereof is 1, 1, 0 and a fourth type thereof is 1, 1, 1, and a first type of the fourth to sixth control signals is 0, 0, 0, a second type thereof is 1, 0, 1, a third type thereof is 0, 1, 1 and a fourth type thereof is 1, 1, 0.

6. The processor of claim 4, wherein the first controller outputs exchanged values of the second type and fourth type in accordance with the fourth-sixth control signals in the inverse FFT mode.

7. The processor of claim 3, wherein the first controller generates only upper ¼ of ROM addresses generated at 8K-point in case of 2K-point.

8. The processor of claim 3, wherein the 16-point radix-4 converter comprises:
   first and second delay units for sequentially delaying input data;
   a third delay unit for delaying an output of the second delay unit and generating a first output;
   fourth to sixth delay units for sequentially delaying an output of the third delay unit;
   a first switch for switching an input data or an output of the fourth delay unit and generating a second output in accordance with the first control signal;
   a second switch for switching respective outputs of the first delay unit or the fifth delay unit and generating a third output in accordance with the second control signal; and
   a third switch for switching respective outputs of the second delay unit or the sixth delay unit and generating a fourth output in accordance with the third control signal.

9. The processor of claim 8, wherein the first to sixth delay units include respectively four registers, and the first to third switches switch respective outputs of the first and second delay units when the first to third control signals are respectively 0.

10. The processor of claim 3, wherein the radix-4 butterfly operator comprises:
    a fourth switch for outputting a real number portion and an imaginary number portion of the first output in accordance with the fourth control signal;
    a fifth switch for outputting a real number portion and an imaginary number portion of the third output in accordance with the fourth control signal;
    a first adder/subtractor for adding/subtracting an output of the fourth switch and a real number portion of the second output in accordance with the fifth control signal;
    a second adder/subtractor for adding/subtracting an output of the fifth switch and a real number portion of the fourth output in accordance with the fifth control signal;
    a third adder/subtractor for adding/subtracting an output of the fourth switch and an imaginary number portion of the second output in accordance with the sixth control signal;
    a fourth adder/subtractor for adding/subtracting an output of the fifth switch and an imaginary real number portion of the fourth output in accordance with the sixth control signal;
    a sixth switch for switching respective outputs of the first adder/subtractor and the second adder/subtractor in accordance with a mode control signal;
    a seventh switch for switching respective outputs of the third adder/subtractor and the fourth adder/subtractor in accordance with a mode control signal;
    a fifth adder/subtractor for adding/subtracting two outputs outputted from the sixth switch in accordance with the fourth control signal; and
    a sixth adder/subtractor for adding/subtracting two outputs outputted from the seventh switch in accordance with the fourth control signal.

11. The processor of claim 10, wherein the respective adders/subtractors are operated as adders when the control signal is 0 and as subtractors when the control signal is 1, the fourth switch outputs a real number portion of the first output to the first adder/subtractor and an imaginary number portion thereof to the third adder/subtractor when the fourth control signal is 0, and the fifth switch outputs a real number portion of the third output to the second adder/subtractor when the fourth control signal is 0 and an imaginary number portion thereof to the fourth adder/subtractor when the fourth control signal is 0.

12. The processor of claim 10, wherein the processor is in FFT mode when the mode control signal is 0 and in inverse FFT mode when the mode control signal is 1.

13. The processor of claim 10, wherein the sixth switch provides respective outputs of the first and second adders/subtractors as the first and second inputs of the fifth adder/subtractor in the FFT mode and provides respective outputs of the second and first adders/subtractors as the first and second inputs of the fifth adder/subtractor in the inverse FFT mode, and the seventh switch provides respective outputs of the fourth and third adders/subtractors as the first and second inputs of the sixth adder/subtractor in the FFT mode and provides respective outputs of the third and fourth adders/subtractors as the first and second inputs of the sixth adder/subtractor in the inverse FFT mode.

14. The processor of claim 3, wherein the radix-2 operation circuit comprises:
    a second controller for outputting a control signal;
    a radix-2 converter for rearranging an input data in accordance with the control signal; and
    a CBFP algorithm for receiving an output of the radix-2 converter and including a radix-2 butterfly operation performing a butterfly operation in accordance with the control signal.

15. The processor of claim 14, wherein the radix-2 converter comprises:
    a seventh delay unit for delaying the input data and generating a first output;
    an eighth delay unit for delaying an output of the seventh delay unit.

16. The processor of claim 14, wherein the radix-2 butterfly operator comprises:
    a first adder/subtractor for adding or subtracting real number portions of the first and second outputs in accordance with the control signal; and
    a second adder/subtractor for adding or subtracting imaginary number portions of the first and second outputs in accordance with the control signal.

17. The processor of claim 16, wherein the first and second adder/subtractor operates as an adder when the control signal is 0 and as an subtractor when the control signal is 1.

18. The processor of claim 3, wherein the convergent block floating point circuit comprises:
    an index detector for detecting an index from the input data;
    a scaling index determiner for storing an output of the index detector as a temporary index, comparing the stored temporary index with a subsequent temporary index, and determining the smaller value of the two as a scaling index with regard to a reference frame;
    a delay unit for delaying an input data; and
    a decoder for decoding an output of the delay unit as a scaling index determined in the scaling index determiner.

19. The processor of claim 18, wherein the convergent block floating point circuit receives respective upper N/4 outputs of the second-six radix-4 operation circuits, detects a scaling index per reference frame, and wherein the reference frame is ¼ of the upper N/4 outputs.

20. The processor of claim 1, wherein the addition circuit comprises five delay units and five adders.

* * * * *